(12) United States Patent
Endou

(10) Patent No.: US 9,055,024 B2
(45) Date of Patent: Jun. 9, 2015

(54) COMMUNICATION SYSTEM

(75) Inventor: Masahito Endou, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 24 days.

(21) Appl. No.: 13/467,384

(22) Filed: May 9, 2012

(65) Prior Publication Data

US 2012/0287938 A1 Nov. 15, 2012

(30) Foreign Application Priority Data

May 11, 2011 (JP) .................................. 2011-105878
Mar. 12, 2012 (JP) .................................. 2012-054341

(51) Int. Cl.
| | |
|---|---|
| H04L 12/28 | (2006.01) |
| H04L 29/08 | (2006.01) |
| H04L 12/46 | (2006.01) |
| H04L 12/66 | (2006.01) |
| H04L 29/06 | (2006.01) |
| H04W 12/02 | (2009.01) |

(52) U.S. Cl.
CPC ............ H04L 67/00 (2013.01); H04L 12/4633 (2013.01); H04L 12/66 (2013.01); H04L 63/0272 (2013.01); H04W 12/02 (2013.01)

(58) Field of Classification Search
USPC ......................................................... 709/248
See application file for complete search history.

(56) References Cited

U.S. PATENT DOCUMENTS

| | | | |
|---|---|---|---|
| 2006/0015559 A1* | 1/2006 | Yabe et al. ..................... 709/206 |
| 2007/0268896 A1* | 11/2007 | Oyama et al. ................. 370/389 |
| 2008/0144625 A1* | 6/2008 | Wu et al. ........................ 370/392 |
| 2008/0222304 A1* | 9/2008 | Sibal et al. ..................... 709/238 |
| 2008/0298312 A1* | 12/2008 | Zhang et al. ................... 370/328 |
| 2009/0016360 A1* | 1/2009 | Kurita ............................ 370/397 |
| 2009/0059837 A1* | 3/2009 | Kurk et al. ..................... 370/315 |
| 2010/0150154 A1* | 6/2010 | Viger et al. .................... 370/389 |
| 2010/0281251 A1* | 11/2010 | Arauz Rosado .............. 713/152 |
| 2011/0167162 A1* | 7/2011 | Ishida et al. ................... 709/227 |
| 2012/0106523 A1* | 5/2012 | Anumala et al. .............. 370/338 |

FOREIGN PATENT DOCUMENTS

| | | |
|---|---|---|
| JP | 2009-260451 A | 11/2009 |
| JP | 2010-141656 A | 6/2010 |
| WO | 2009007109 A2 | 1/2009 |
| WO | 2009/093308 A1 | 7/2009 |
| WO | 2011/041058 A2 | 4/2011 |

OTHER PUBLICATIONS

ISA, ISA Approves standard for wireless automation in Process control application, Sep. 22, 2009,.*
ISA ( ISA Approves Standard for Wireless Automation in Process Control Applications), published on Sep. 22, 2009.*
European Search Report corresponding to European Patent Application No. 12167294.3, dated Aug. 16, 2012.
No. ISA-100a-2009, Wireless Systems for Industrial Automation: Process Control and Related Applications, International Society of Automation, United States, Jan. 1, 2009, XP008138284, pp. 1-817.

* cited by examiner

*Primary Examiner* — Candal Elpenord
*Assistant Examiner* — Hardikkumar Patel
(74) *Attorney, Agent, or Firm* — Sughrue Mion, PLLC

(57) ABSTRACT

A communication system may include a first network connected to lower-layer equipment, a second network connected to a higher-layer application, a gateway device connected to the first network and the second network, and a tunnel device connected to the first network and the second network, the tunnel device bypassing the gateway device.

14 Claims, 6 Drawing Sheets

COMMUNICATION SYSTEM

BACKGROUND OF THE INVENTION

1. Field of the Invention

The present invention relates to a communication system. In particular, the present invention relates to a communication system in which equipment connected to a first network communicates with a higher-layer application connected to a second network via a gateway, and more particularly to technology for connecting a lower-layer wireless transmitter subsystem to a higher-layer application.

Priority is claimed on Japanese Patent Application No. 2011-105878, filed May 11, 2011, and Japanese Patent Application No. 2012-054341, filed Mar. 12, 2012, the contents of which are incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

FIG. 5 is a functional block diagram illustrating a configuration example of a communication system in accordance with the related art. The communication system includes a first network (backbone network) 10 and a second network (control network) 50.

The first network (backbone network) 10 is connected to wireless transmitters 31, 32, and 33, which are lower-layer equipment, via a backbone router (BBR) 20.

A system management device 40 connected to the first network 10 manages communication resources of the wireless transmitters 31, 32 and 33. The system management device 40 receives communication resource requests from the wireless transmitters 31, 32, and 33, and distributes optimum communication resource allocations to the wireless transmitters 31, 32, and 33.

The second network (control network) 50 is connected to an application 60, which is higher-layer equipment. A gateway device 70 is connected to the first network 10 and the second network 50.

FIG. 6 is a functional block diagram illustrating a communication path in the communication system of FIG. 5. During communication with the higher-layer application 60, the wireless transmitters 31, 32, and 33, which are lower-layer equipment, need to go through the gateway device 70.

The gateway device 70 detects all communications passing through the gateway device 70, and performs protocol conversion if necessary. It is necessary to perform communication via the gateway device 70 when encrypted communication is performed between equipment connected to different layers. Thus, it may be impossible to secure end-to-end security between the equipment that performs communication.

In the communication system in accordance with the related art, for example, Japanese Unexamined Patent Application, First Publication No. 2009-260451, it may be impossible to perform direct communication between the equipment connected to the different layers when a communication partner is, for example, equipment based on International Society for Automation (ISA) 100.11a. In addition, it may be impossible to secure the end-to-end security between the equipment that performs communication.

In addition, the gateway device for performing a relay function between different layers detects all communications passing through the gateway device, and performs protocol conversion if necessary. Accordingly, when new communication is performed between the equipment connected to the different layers, the gateway device needs to handle the new communication.

SUMMARY

The present invention implements a communication system that enables direct communication to be performed between equipment connected to different layers. Thereby, the direct communication between the equipment connected to the different layers is possible and end-to-end security is secured.

A communication system may include: a first network connected to lower-layer equipment; a second network connected to a higher-layer application; a gateway device connected to the first network and the second network; and a tunnel device connected to the first network and the second network, the tunnel device bypassing the gateway device.

If the application transmits a network connection request to the tunnel device, then a network connection response is returned to the application.

If the application receives the network connection response, then the application may set up a virtual tunnel for connecting the application to the tunnel device, and directly communicate with the equipment via the virtual tunnel.

The lower-layer equipment may directly communicate with the application via the tunnel device to secure end-to-end security between the lower-layer equipment and the application.

The tunnel device may execute an encryption process and an authentication process for communication between the tunnel device and the application.

The tunnel device may include a priority control processing unit configured to perform a priority control process based on priority information for data to be communicated between the first network and the second network via the tunnel device.

The tunnel device may include an access control processing unit that configured to perform an access control process based on access permission information for data to be communicated between the first network and the second network via the tunnel device.

The tunnel device may include a tunnel device synchronization unit configured to synchronize and equalize mutual setting information with another tunnel device connected to the first network and the second network.

The tunnel device may be implemented on the same hardware as the gateway device.

The equipment may be a wireless transmitter based on an on International Society for Automation (ISA) 100.11a standard.

A communication method in a communication system in which a lower-layer equipment connected to a first network performs communication with a higher-layer application connected to a second network via a gateway device may include bypassing the gateway device by using a tunnel device that is connected between the first network and the second network to perform the communication.

The communication method may further include: returning a network connection response to the application if the application transmits a network connection request to the tunnel device.

The communication method may further include: setting up a virtual tunnel for connecting the application to the tunnel device, and directly communicating with the equipment via the virtual tunnel if the application receives the network connection response.

The lower-layer equipment may directly communicate with the application via the tunnel device to secure end-to-end security between the lower-layer equipment and the application.

The communication method may further include: by the tunnel device, executing an encryption process and an authentication process for communication between the tunnel device and the application.

The communication method may further include: performing a priority control process based on priority information for data to be communicated between the first network and the second network via the tunnel device.

The communication method may further include: performing an access control process based on access permission information for data to be communicated between the first network and the second network via the tunnel device.

The communication method may further include: synchronizing and equalizing mutual setting information with another tunnel device connected to the first network and the second network.

The tunnel device may be implemented on the same hardware as the gateway device.

The equipment may be a wireless transmitter based on an on International Society for Automation (ISA) 100.11a standard.

According to the present invention, it is possible to virtually extend a lower-layer network under a gateway device to an application by setting up a virtual tunnel between an application and a tunnel device.

As a result, the application can directly communicate with a wireless transmitter connected to the lower-layer network under control of the gateway device. For example, an application connected to a network based on ISA 100.11a can secure end-to-end security with a wireless transmitter using a mechanism of ISA 100.11a.

It is unnecessary to change the gateway device by employing a tunnel device. In addition, because this mechanism is not specialized for a specific application, it is possible to perform handling without changing the gateway device even when a new application is connected.

The tunnel device performs an encryption process/authentication process and therefore only an authenticated application can perform encrypted secure communication.

By performing a priority control process of setting priority for data to be communicated between the first network and the second network via the tunnel device, it is possible to give high priority to processing sensor data, control data, or the like and to lower priority to processing setting data, diagnosis information, or the like. Thereby, it is possible to construct a system that enables important data to be processed at a high speed in process control.

It is possible to execute an access control process of setting whether or not to permit access to data to be communicated between the first network and the second network via the tunnel device. Thereby, it is possible to block the passage of data likely to be a security threat, and to limit communication via the tunnel device to only specific equipment.

It is possible to improve fault tolerance of tunnel devices by multiplexing the tunnel devices and executing a synchronization process.

The tunnel devices can be implemented on one piece of hardware physically with the gateway device.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

Figure 1:
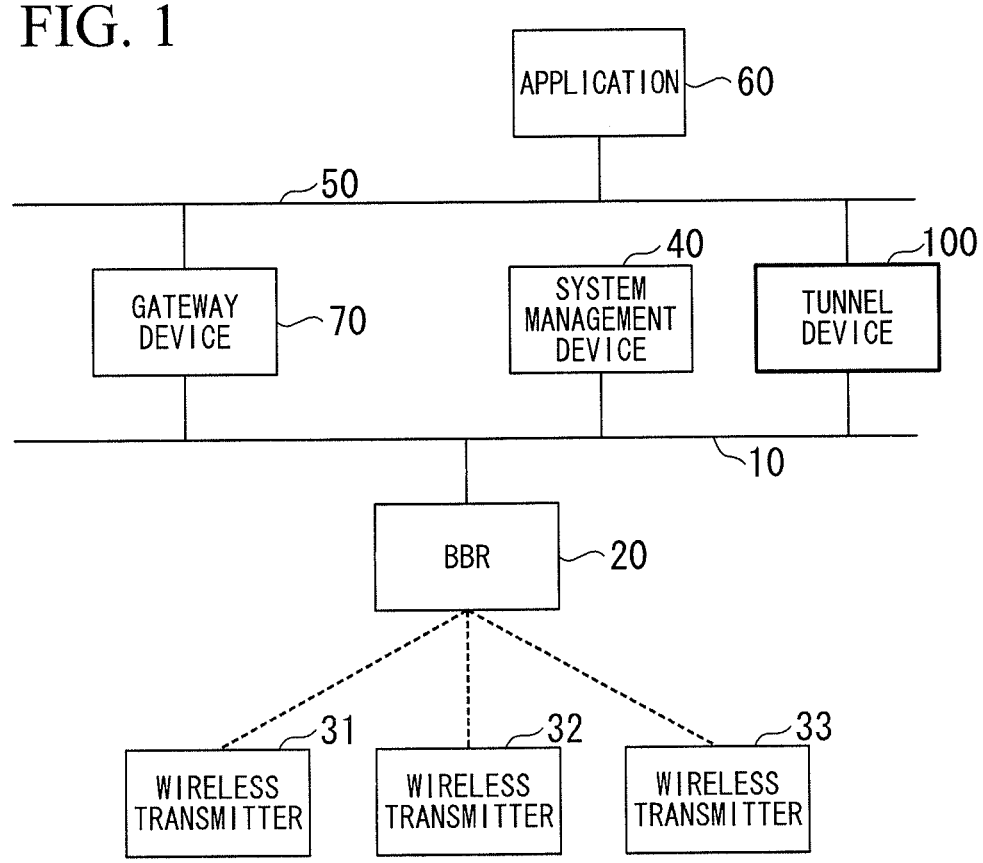
FIG. 1 is a functional block diagram illustrating a communication system in accordance with a first preferred embodiment of the present invention.
Figure 5:
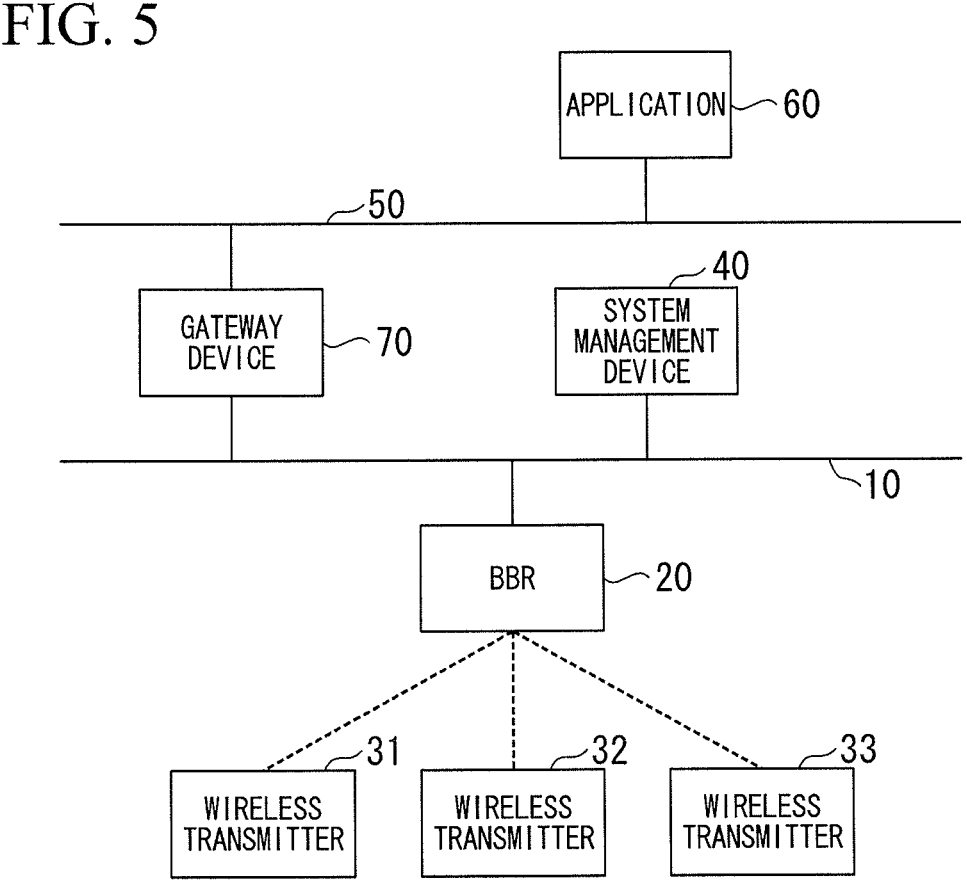
FIG. 5 is a functional block diagram illustrating a configuration example of a communication system in accordance with the related art.
Figure 6:
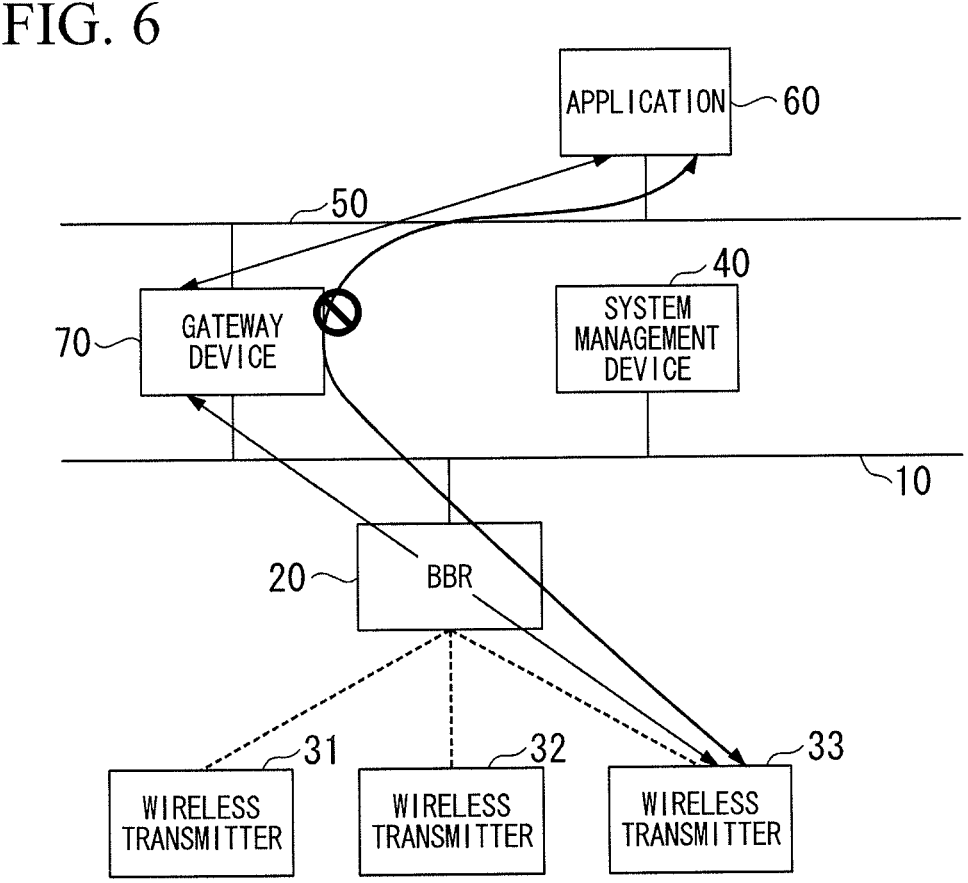
FIG. 6 is a functional block diagram illustrating a communication path in the communication system of FIG. 5.

FIG. 1 is a functional block diagram illustrating a communication system in accordance with a first preferred embodiment of the present invention. The same elements as those illustrated in FIG. 5 are denoted by the same reference numerals.

The communication system includes a first network (backbone network) 10 and a second network (control network) 50.

The first network (backbone network) 10 is connected to wireless transmitters 31, 32, and 33, which are lower-layer equipment, via a BBR 20.

The system management device 40 connected to the first network 10 manages communication resources of the wireless transmitters 31, 32 and 33. A system management device 40 receives communication resource requests from the wireless transmitters 31, 32, and 33, and distributes optimum communication resource allocations to the wireless transmitters 31, 32, and 33.

The second network (control network) 50 is connected to an application 60, which is higher-layer equipment. A gateway device 70 is connected to the first network 10 and the second network 50.

In FIG. 1, an element added to the configuration of the related art illustrated in FIG. 5 is a tunnel device 100. The tunnel device 100 is connected to the first network 10 and the second network 50, and bypasses a gateway device 70.

Figure 2:
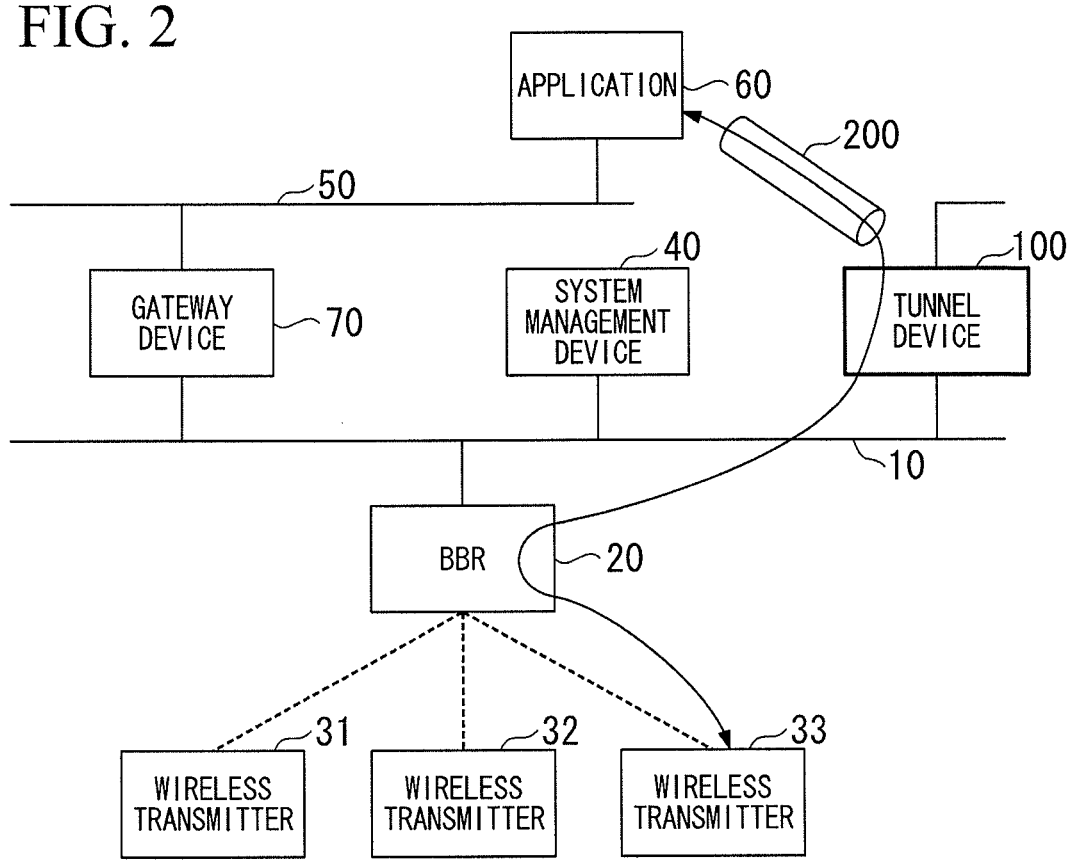
FIG. 2 is a functional block diagram illustrating a communication path in the communication system of FIG. 1.

FIG. 2 is a functional block diagram illustrating a communication path in the communication system of FIG. 1. The application 60 transmits a network connection request to the tunnel device 100. The tunnel device 100 sets up a tunnel between the tunnel device 100 and the application 60, and returns a network connection response to the application 60 via the tunnel.

The application 60 receiving the network connection response from the tunnel device 100 sets up a virtual tunnel 200 between the application 60 and the tunnel device 100. The application 60 joins a system management device 40 via the set-up virtual tunnel 200 using communication based on ISA 100.11a. Thereafter, the application 60 directly communicates with the wireless transmitters 31 to 33 based on ISA 100.11a.

Figure 3:
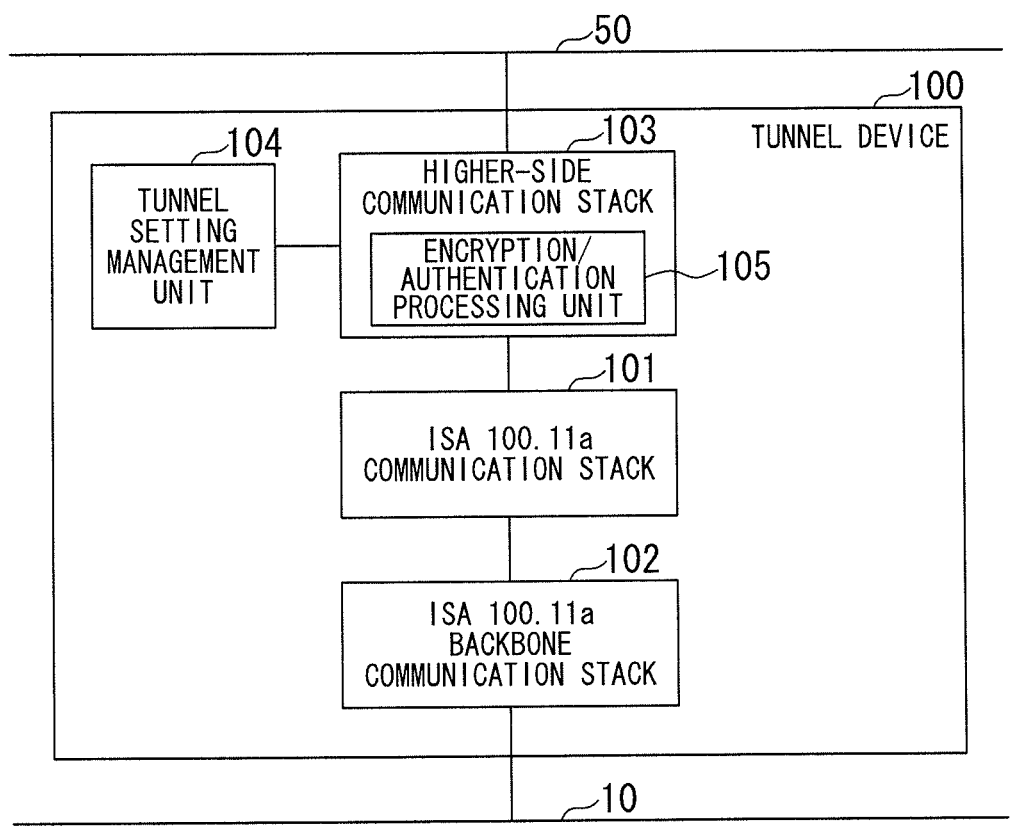
FIG. 3 is a functional block diagram illustrating a configuration of the tunnel device in the communication system in accordance with the first preferred embodiment of the present invention.

FIG. 3 is a functional block diagram illustrating a configuration of the tunnel device in the communication system in accordance with the first preferred embodiment of the present invention. The tunnel device 100 has functions of an ISA 100.11a communication stack 101, an ISA 100.11a backbone communication stack 102, which is an interface with the first network 10, a higher-side communication stack 103, which is an interface with the second network 50, and a tunnel setting management unit 104. The ISA 100.11a communication stack 101 is a communication stack based on an ISA 100.11a specification.

The ISA 100.11a backbone communication stack 102 is a stack of a communication protocol used by an ISA 100.11a backbone network (the first network 10) of the system serving as an object. An Internet protocol (IP) or IP version 6 (IPv6) protocol stack corresponds thereto.

The higher-side communication stack 103 is a communication protocol stack used by a network (the second network 50) connected to a higher-side interface of the tunnel device 100. In general, this communication stack is an IP or IPv6 protocol stack. The tunnel setting management unit 104 sets up/manages the virtual tunnel 200, which is set up between the application 60 and the tunnel device 100. The tunnel setting management unit 104 manages a tunnel creation request transmitted from the application 60, and sets up a tunnel between the tunnel device and the application.

The higher-side communication stack 103 includes an encryption/authentication processing unit 105. The tunnel device 100 performs an encryption process/authentication process and therefore only an authenticated application can perform encrypted secure communication.

Figure 4:
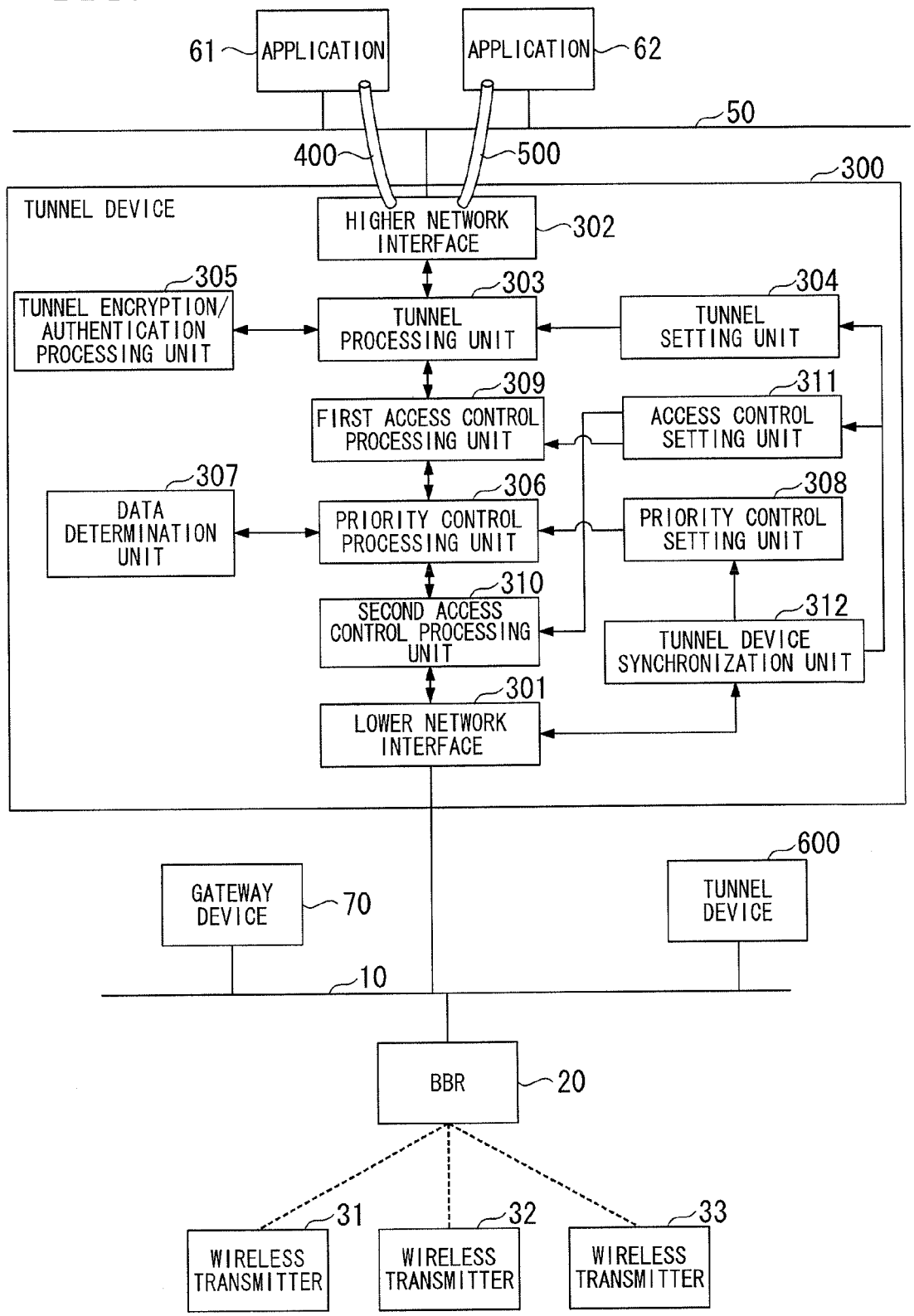
FIG. 4 is a functional block diagram illustrating configurations of the communication system and the tunnel device in accordance with a second preferred embodiment of the present invention.

FIG. 4 is a functional block diagram illustrating configurations of the communication system and the tunnel device in accordance with a second preferred embodiment of the present invention. The same elements as those illustrated in FIG. 5 are denoted by the same reference numerals.

The communication system includes a first network (backbone network) 10 and a second network (control network) 50.

The first network (backbone network) 10 is connected to wireless transmitters 31, 32, and 33, which are lower-layer equipment, via a BBR 20.

The second network (control network) 50 is connected to applications 61 and 62, which are higher-layer equipment. A gateway device 70 is connected to the first network 10 and a second network 50.

Tunnel devices 300 and 600 are connected to the first network 10 and the second network 50, and bypass the gateway device 70.

As a first feature of the second preferred embodiment, the tunnel device 300 executes a priority control process of setting priority for data to be communicated between the first network 10 and the second network 50 via the tunnel device 300. According to this function, it is possible to give high priority to processing sensor data, control data, or the like and to give low priority to processing setting data, diagnosis information, or the like. Thereby, it is possible to construct a system that enables important data to be processed at a high speed in process control.

As a second feature of the second preferred embodiment, the tunnel device 300 can execute an access control process of setting whether or not to permit access to data to be communicated between the first network 10 and the second network 50 via the tunnel device 300. According to this function, it is possible to block the passage of data, which is likely to be a security threat, and to limit communication via the tunnel device to only specific equipment.

As a third feature of the second preferred embodiment, the tunnel device 300 performs an equalization process by synchronizing mutual setting information with the other tunnel device 600 for backup connected between the first network 10 and the second network 50. According to this function, it is possible to improve fault tolerance of the tunnel device.

The application 61 is connected to the second network 50, and a virtual tunnel 400 is set up between the application 61 and the tunnel device 300. The application 62 is connected to the second network 50, and a virtual tunnel 500 is set up between the application 62 and the tunnel device 300.

The application 61 communicates with the wireless transmitter 31 of the first network 10, and the application 62 communicates with the wireless transmitter 32 of the first network 10. The tunnel device 600 connected to the first network 10 and the second network 50 backs up the tunnel device 300.

The tunnel device 300 includes a lower network interface 301, a higher network interface 302, a tunnel processing unit 303, a tunnel setting unit 304, a tunnel encryption/authentication processing unit 305, a priority control processing unit 306, a data determination unit 307, a priority control setting unit 308, a first access control processing unit 309, a second access control processing unit 310, an access control setting unit 311, and a tunnel device synchronization unit 312.

The lower network interface 301 is an interface of communication with the tunnel device 300 and the first network 10. The higher network interface 302 is an interface of communication with the tunnel device 300 and the second network 50.

The tunnel processing unit 303 assigns a higher-layer protocol stack used by the second network 50 to a message acquired from lower-layer equipment connected to the first network 10 via the lower network interface 301, and transfers the message with the higher-layer protocol stack to the higher-layer applications 61 and 62 via the higher network interface 302. This is a backbone function of the tunnel processing unit 303.

On the other hand, after excluding a higher-layer protocol stack from a message acquired from higher-layer equipment connected to the second network 50 via the higher network interface 302, the tunnel processing unit 303 transfers the message to lower-layer equipment via the lower network interface 301.

Based on a request from the application 61, the tunnel setting unit 304 defines and sets up the virtual tunnel 400 for the application 61 with respect to the tunnel processing unit 303. In addition, based on a request from the application 62, the tunnel setting unit 304 defines and sets up the virtual tunnel 500 for the application 62 with respect to the tunnel processing unit 303.

The tunnel encryption/authentication processing unit 305 performs an encryption/authentication process for a message processed by the tunnel processing unit 303. According to this process, only an authenticated application can perform encrypted secure communication.

The priority control processing unit 306 performs a priority control process based on priority (priority information) set by the priority control setting unit 308 and the type of data determined by the data determination unit 307 for data to be communicated between the first network 10 and the second network 50 via the tunnel device 300. According to the priority control process, it is possible to give high priority to processing sensor data, control data, or the like and to give low priority to processing setting data, diagnosis information, or the like. Thereby, it is possible to construct a system that enables important data to be processed at a high speed in process control.

The data determination unit 307 acquires data input to the priority control processing unit 306, determines the type of the data, and returns a determination result to the priority control processing unit 306. The priority control setting unit 308 sets an order of priority processing for the priority control processing unit 306.

The first access control processing unit 309 is provided at a higher-layer side of the priority control processing unit 306. The second access control processing unit 310 is provided at a lower-layer side of the priority control processing unit 306. The first access control processing unit 309 and the second access control processing unit 310 perform an access control process of setting whether or not to permit access to data to be communicated between the first network 10 and the second network 50 via the tunnel device 300.

According to this access control process, it is possible to block the passage of data through the tunnel device 300 that is likely to be a security threat, and to limit communication via the tunnel device 300 to only communication with a specific wireless transmitter. For example, the application 61 can communicate with only the wireless transmitter 31, and the application 62 can communicate with only the wireless transmitter 32.

With respect to the first access control processing unit 309 and the second access control processing unit 310, the access control setting unit 311 sets a wireless transmitter (permission information) for which access is permitted. Non-permitted access to the wireless transmitter is rejected.

The tunnel device synchronization unit 312 performs an equalization process by synchronizing mutual setting information with the other tunnel device 600 for backup connected between the first network 10 and the second network 50. According to this function, it is possible to improve the fault tolerance of the tunnel device.

In the above-described preferred embodiments, the tunnel devices 100, 300, and 600 may be provided inside the gateway device 70, for example, within the same housing. In addition, the tunnel devices 100, 300, and 600 and the gateway device 70 may be implemented on the same hardware.

Although a wireless transmitter based on the ISA 100.11a standard is shown as lower-layer equipment in the above-described preferred embodiment, an object to be applied to the present invention is not limited thereto. It is also possible to effectively apply the present invention to something based on another standard such as the WirelessHART standard.

As used herein, the following directional terms "forward, rearward, above, downward, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus-function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A communication system comprising:
   a first network connected to lower-layer equipment;
   a second network connected to a higher-layer application being higher than the lower-layer equipment;
   a gateway device connected to the first network and the second network; and
   a tunnel device connected to the first network and the second network, the tunnel device bypassing the gateway device,
   wherein:
   when the higher-layer application transmits a network connection request to the tunnel device, then a network connection response is returned to the higher-layer application, and when the higher-layer application receives the network connection response, then the higher-layer application sets up a virtual tunnel for connecting the higher-layer application to the tunnel device to virtually extend the first network to the higher-layer application, and directly communicates with the lower-layer equipment via the virtual tunnel;
   wherein the tunnel device comprises a first communication stack connected to the first network and a second communication stack connected to the second network;
   wherein the second communication stack comprises an encryption and authentication processing unit configured to execute an encryption process and an authentication process for communication between the tunnel device and the higher-layer application; and
   wherein, in order to improve a fault tolerance of the tunnel device, the tunnel device comprises a tunnel device synchronization unit configured to synchronize and equalize mutual setting information with another tunnel device for backup connected to the first network and the second network.

2. The communication system according to claim 1, wherein the lower-layer equipment directly communicates with the higher-layer application via the tunnel device to secure end-to-end security between the lower-layer equipment and the higher-layer application.

3. The communication system according to claim 1, wherein the tunnel device comprises a priority control processing unit configured to perform a priority control process based on priority information for data to be communicated between the first network and the second network via the tunnel device.

4. The communication system according to claim 1, wherein the tunnel device comprises an access control processing unit that configured to perform an access control process based on access permission information for data to be communicated between the first network and the second network via the tunnel device.

5. The communication system according to claim 1, wherein the tunnel device is implemented on a same hardware as the gateway device.

6. The communication system according to claim 1, wherein the lower-layer equipment is a wireless transmitter based on an International Society for Automation (ISA) 100.11a standard.

7. A communication method in a communication system in which a lower-layer equipment connected to a first network performs communication with a higher-layer application being higher than the lower-layer equipment, the higher-layer application being connected to a second network via a gateway device, the communication method comprising:

bypassing the gateway device by using a tunnel device that is connected between the first network and the second network to perform the communication, the tunnel device comprising a first communication stack connected to the first network and a second communication stack connected to the second network;

returning a network connection response to the higher-layer application when the higher-layer application transmits a network connection request to the tunnel device;

setting up a virtual tunnel for connecting the higher-layer application to the tunnel device by the higher-layer application to virtually extend the first network to the higher-layer application and directly communicating with the lower-layer equipment via the virtual tunnel when the higher-layer application receives the network connection response;

executing an encryption process and an authentication process for communication between the tunnel device and the higher-layer application, the second communication stack comprising an encryption and authentication processing unit, the encryption and authentication processing unit executing the encryption process and the authentication process; and synchronizing and equalizing mutual setting information with another tunnel device for backup connected to the first network and the second network in order to improve a fault tolerance of the tunnel device.

8. The communication method according to claim 7, wherein the lower-layer equipment directly communicates with the higher-layer application via the tunnel device to secure end-to-end security between the lower-layer equipment and the higher-layer application.

9. The communication method according to claim 7, further comprising:

performing a priority control process based on priority information for data to be communicated between the first network and the second network via the tunnel device.

10. The communication method according to claim 7, further comprising:

performing an access control process based on access permission information for data to be communicated between the first network and the second network via the tunnel device.

11. The communication method according to claim 7, wherein the tunnel device is implemented on a same hardware as the gateway device.

12. The communication method according to claim 7, wherein the lower-layer equipment is a wireless transmitter based on an International Society for Automation (ISA) 100.11a standard.

13. The communication system according to claim 1, wherein the tunnel device comprises a tunnel setting management unit connected to the second communication stack and configured to set and manage the virtual tunnel.

14. The communication method according to claim 7, wherein the tunnel device comprises a tunnel setting management unit connected to the second communication stack and configured to set and manage the virtual tunnel.

* * * * *